(12) United States Patent
Markovsky et al.

(10) Patent No.: US 10,989,919 B2
(45) Date of Patent: Apr. 27, 2021

(54) SUPPORT ASSEMBLY PAD SHAPE FOR PROVIDING UNIVERSAL FITTING HEAD-MOUNTED DISPLAY DEVICES

(71) Applicant: Microsoft Technology Licensing, LLC, Redmond, WA (US)

(72) Inventors: Igor Markovsky, San Jose, CA (US); Shahar Ben-Menahem, Mountain View, CA (US); Michael Nikkhoo, Saratoga, CA (US); Tzu-Yuan Lin, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 15/984,186

(22) Filed: May 18, 2018

(65) Prior Publication Data
US 2019/0353901 A1    Nov. 21, 2019

(51) Int. Cl.
*G03H 1/00*     (2006.01)
*G02B 27/01*    (2006.01)

(52) U.S. Cl.
CPC ..... *G02B 27/0149* (2013.01); *G02B 27/0172* (2013.01); *G02B 2027/0123* (2013.01); *G02B 2027/0169* (2013.01)

(58) Field of Classification Search
CPC ... G02B 5/30; G02B 5/32; G02B 6/00; G02B 27/0103; G02B 27/0172; G03H 1/0272; G03H 2270/55
(Continued)

(56) References Cited

U.S. PATENT DOCUMENTS 10,497,320 B1 *  12/2019  Ouderkirk .............. G06F 3/011
10,564,427 B2 *   2/2020  Ouderkirk ........... G02B 5/3066
(Continued)

FOREIGN PATENT DOCUMENTS

CN    206960780 U  *  2/2018
CN    206960780 U     2/2018

OTHER PUBLICATIONS

Nielsen: "Bio-Surfaces and Geometric References for a Standardized Biomechanical Design Methodology for Mass Customization", 2008, Brigham Young University, Dissertation (Year: 2008).*
(Continued)

*Primary Examiner* — William R Alexander
*Assistant Examiner* — Tamara Y. Washington
(74) *Attorney, Agent, or Firm* — Newport IP, LLC; Mike R. Cicero

(57) ABSTRACT

A pad shape for a support assembly is optimized to provide universal fitting characteristics to Head-Mounted Display (HMD) devices. The pad shape enables a display of a single HMD device to be reliably aligned within multiple users' fields-of-view notwithstanding significant variations of shape and size between these users' heads. Optimal positioning of the display within the multiple users' fields-of-view may be achieved by positionally constraining the HMD device against a portion of the head that varies relatively slightly as compared to other portions of the head. The contact pad includes a curved region having a shape defined by a high order polynomial that corresponds to an empirically determined best fit surface. Empirically determining one or both of the best fit surface or the high order polynomial may include aligning a plurality of "forehead" point clouds that map the geometries of a sample set of users' foreheads.

20 Claims, 5 Drawing Sheets

(58) Field of Classification Search
USPC ......... 359/14, 629–633, 645, 689, 716, 733, 359/735, 784, 791, 792
See application file for complete search history.

(56) References Cited

U.S. PATENT DOCUMENTS

2019/0285892 A1\* 9/2019 Yang .................. G02B 27/0944
2019/0353901 A1\* 11/2019 Markovsky ........ G02B 27/0176

OTHER PUBLICATIONS

Lee et al., 3D Scan to Product Design: Methods, Techniques, and Cases, SlideShare, Nov. 4, 2015, 58 slides, located at: https://www.slideshare.net/WonsupLee1/3d-scan-to-product-design-methods-techniques-and-cases.
How 3D Scanning Improves Product Design, Neomek, May 18, 2018, 3 pages, located at: http://www.neomek.com/resources/how-3d-scanning-improves-product-design/.
Nielsen, Kimberly Jensen, "Bio-surfaces and Geometric References for a Standardized Biomechanical Design Methodology for Mass Customization", In a Dissertation Submitted to the Faculty of Brigham Young University in Partial Fulfillment of the Requirements for the degree of Doctor of Philosophy, Apr. 1, 2008, 185 Pages.
"International Search Report and Written Opinion Issued in PCT Application No. PCT/US19/030785", dated Jul. 26, 2019, 12 Pages.

\* cited by examiner

SUPPORT ASSEMBLY PAD SHAPE FOR PROVIDING UNIVERSAL FITTING HEAD-MOUNTED DISPLAY DEVICES

BACKGROUND

Ensuring that a display is maintained at an optimal position with respect to a user's field-of-view poses unique challenges in the design of Head-Mounted Display (HMD) devices due to variations of shape and size between different users' heads. This is because for any particular user the optimal position of the display generally falls within a relatively narrow range of that particular user's field-of-view (e.g., due to the nature of the micro-optical systems that the display deploys to generate imagery). Unfortunately, the geometric relationships between users' fields-of-view and those surfaces of the users' heads where HMD devices are physically supported varies greatly from one user to another. Thus, a support assembly that is well suited to maintain an attached display at an optimal position within one user's field-of-view may be poorly suited to do the same for another user. This poses an ergonomic problem because attempting to view images that are generated by a display that is in-optimally placed will typically cause visual fatigue as the user's eyes work hard to focus on the images—often leading to head aches and other user discomfort issues.

Furthermore, because the shapes of users' heads vary greatly from one user to another, designers typically incorporate deformable pads for conforming to the various head shapes. Unfortunately, such deformable pads are generally made of thick materials that are easily compressed and can be worn across a wide range of positions on any given user's head—which only exacerbates the challenges of ensuring that an HMD device display will be optimally positioned with various different users' fields-of-view.

It is with respect to these and other considerations that the disclosure made herein is presented.

SUMMARY

Technologies described herein provide a pad shape for a support assembly that is optimized to provide universal fitting characteristics to Head-Mounted Display (HMD) devices. Generally described, the technologies disclosed herein enable a display of an HMD device to be reliably aligned within multiple users' fields-of-view notwithstanding significant variations of shape and size between these users' heads. Optimal positioning of the display within the multiple users' fields-of-view may be achieved by positionally constraining the HMD device against a portion of the head that varies relatively slightly as compared to other portions of the head. For example, since the shape of the glabella region and supraorbital region of the head vary greatly from one user to another, an exemplary support assembly may be designed so that supporting forces for positionally constraining the display are not derived from these regions. Rather, such supporting forces may be derived from a sub-region of the forehead which is empirically determined to vary relatively slightly (e.g., as compared to other parts of the head) from one user to another. In this way, a support assembly for an HMD device may be optimized so as to minimize the geometric variations between users' fields-of-view and the surface(s) of the users' heads that positionally constrain a display.

In an exemplary embodiment, an HMD device includes a display that is configured to generate imagery within a field-of-view of a user. In an Augmented-Reality (AR) embodiment of the HMD device, the display may be a transparent waveguide display through which a real-world environment is visible to the user and from which the imagery is generated to augment the real-world environment. Alternatively, in a Virtual-Reality (VR) embodiment of the HMD device, the display may be an opaque Organic Light-Emitting Diode (OLED) Display that replaces the real-world environment with a virtual one. It can be appreciated that in either scenario presenting a suitable visual experience to the user may be highly dependent on maintaining an optimal placement of the display with respect to the field-of-view of the user.

The HMD device further includes a support assembly that is specifically designed so that an optimal placement of the display can be repeatably achieved and maintained for multiple different users. When the HMD device is being properly worn by a user, the display protrudes from the support assembly into the field-of-view of the user. The support assembly may include a pressure plate that is mountable to a forehead of the user in order to generate sufficient supporting forces to maintain a position of the display with respect to the user's field-of-view. The pressure plate may be a rigid or substantially rigid element such as, for example, injection molded plastic, carbon-fiber, stamped aluminum, or any other material suitable for supporting the display with a suitable amount of rigidity. The support assembly may also include one or more bands for encircling a user's head to generate pressure between the pressure plate and the user's forehead.

In order to evenly distribute the generated pressure across a contact area so as to prevent points of uncomfortably high pressure, the HMD device may further include a contact pad that is disposed against a proximal surface of the pressure plate. In the context of this disclosure, a proximal surface of a particular element may refer generally to a surface of that particular element which is situated most closely to the user's body as compared to other surfaces of that particular element. When the HMD device is being worn by a user, the contact pad may be squeezed by the pressure plate against the forehead of the user. The contact pad may be formed from a suitably compressible material such as, for example, various commercially available urethane and/or neoprene materials that provide pressure distribution characteristics.

In various embodiments, the contact pad includes a curved region having a shape defined by a high order polynomial that corresponds to an empirically determined best fit surface. This curved region of the contact pad is opposite the pressure plate and, therefore, directly contacts the user's forehead when the HMD device is worn by the user. As described in more detail below, empirically determining one or both of the best fit surface or the high order polynomial may include aligning a plurality of "forehead" point clouds that map the geometries of a sample set of users' foreheads. Once aligned, a curve fitting algorithm may be deployed to generate a polynomial of an Nth degree which defines the best fit surface in terms of relationships between different variables of a coordinate system (e.g., a cartesian coordinate system). In a specific but non-limiting example, a first monomial term that quadratically relates a first coordinate variable to a second coordinate variable, a second monomial term that quadratically relates the first coordinate variable to a third coordinate variable, and a third monomial term that quadratically relates the first coordinate variable to the third coordinate variable.

In various embodiments, the contact pad may have a thickness distribution that corresponds to a difference between an inner surface and an outer surface of the aligned "forehead" point clouds. The inner surface may be defined as a surface that includes at least a threshold amount (e.g., 100%, 90%, etc.) of the innermost points of all the "forehead" point clouds. The outer surface may be defined as a surface that includes at least a threshold amount of the outermost points of all the "forehead" point clouds. It will be appreciated by one skilled in the art that the difference between the inner surface and the outer surface may indicate the maximum amount of available compression (e.g., in terms of distance) that the contact pad should provide at any given point in order to accommodate all of the foreheads of the sample set of users. Accordingly, setting the thickness distribution of the contact pad to correspond to this difference may minimize the thickness of the contact pad needed to provide universal fitting characteristics to the HMD device.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

Figure 3A:
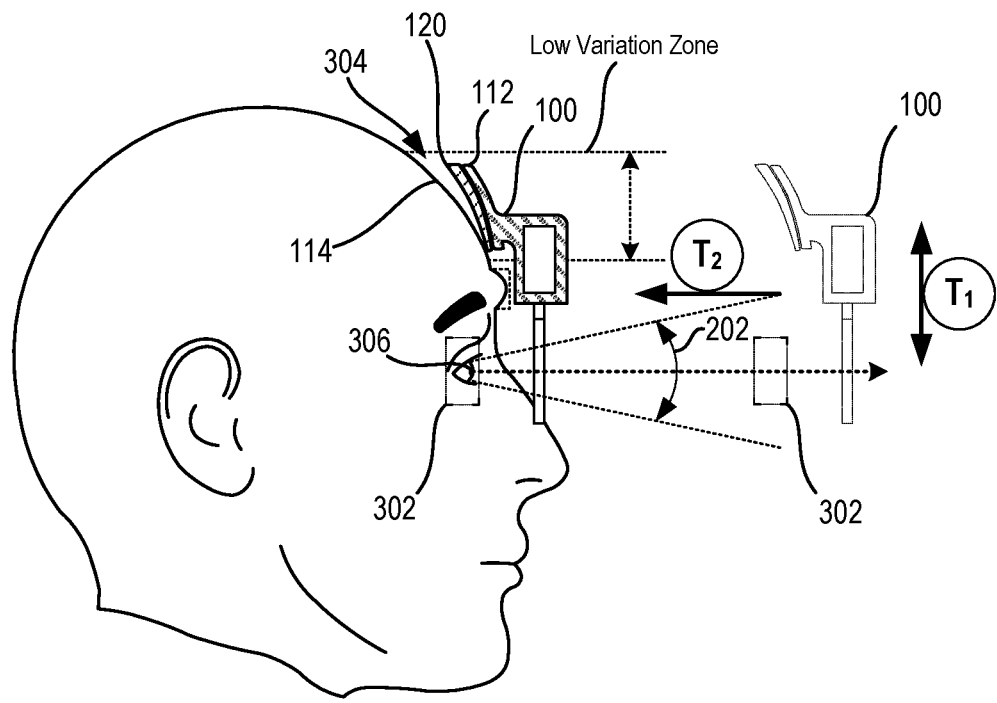

FIG. 3A shows exemplary time-series of movements of a fitting process for the HMD device to ensure that the display is optimally placed within the user's field-of-view. In particular, FIG. 3A illustrates a first two out of three movements included within the fitting process for bringing the HMD device into contact with the head with the eye box appropriately lined up with respect to the field-of-view.

Figure 3B:
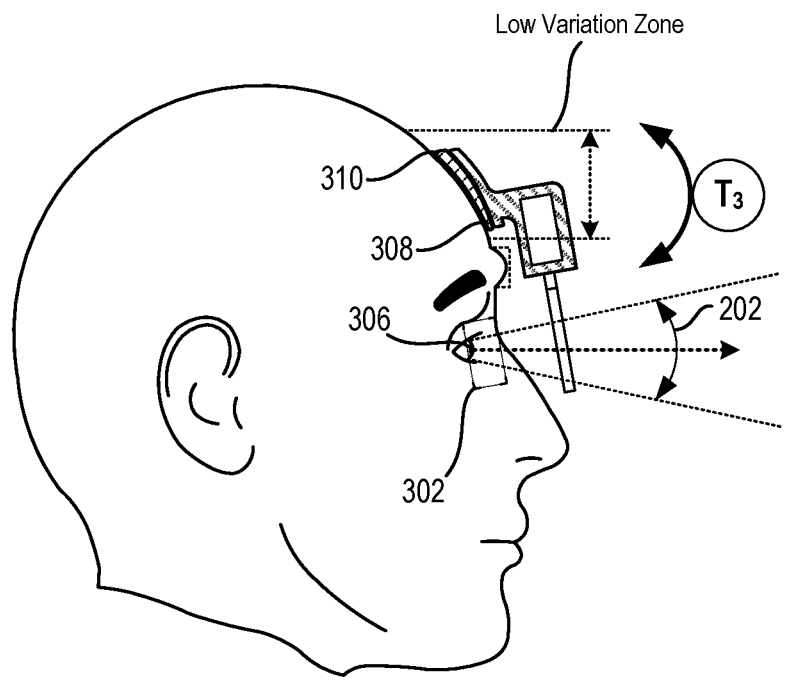

FIG. 3B shows a third movement of the fitting process that brings a contact pad fully into contact with the user's forehead to adequately secure the HMD to the user's head.

Figure 4:
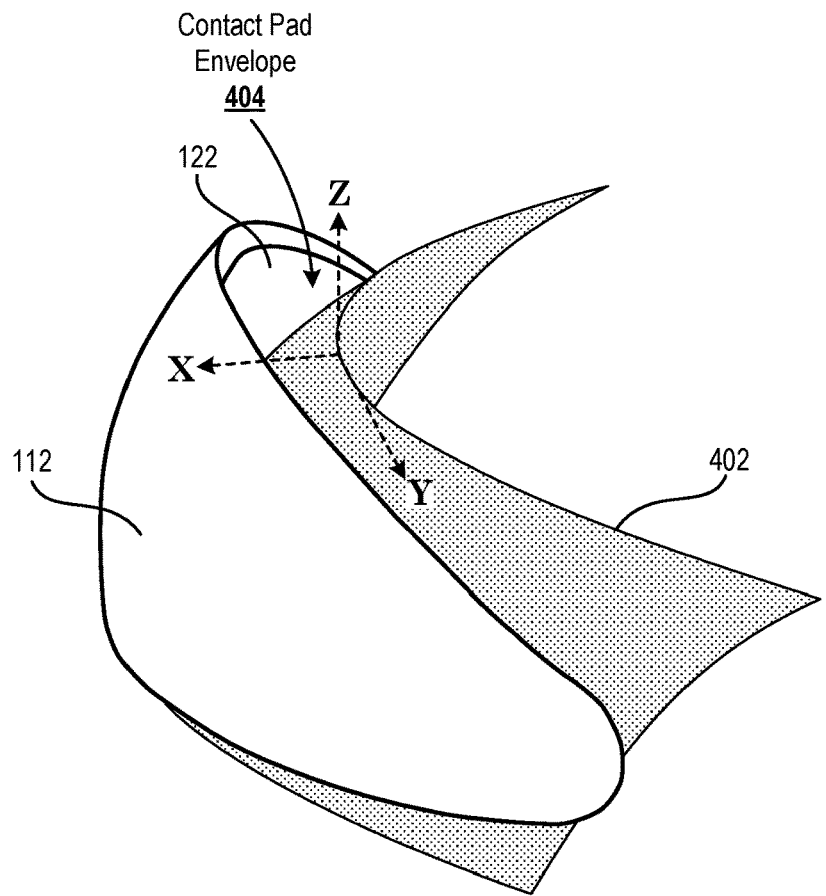

FIG. 4 illustrates an exemplary best fit surface (shown with a dotted pattern) in relation to a pressure plate of the HMD device.

Figure 5:
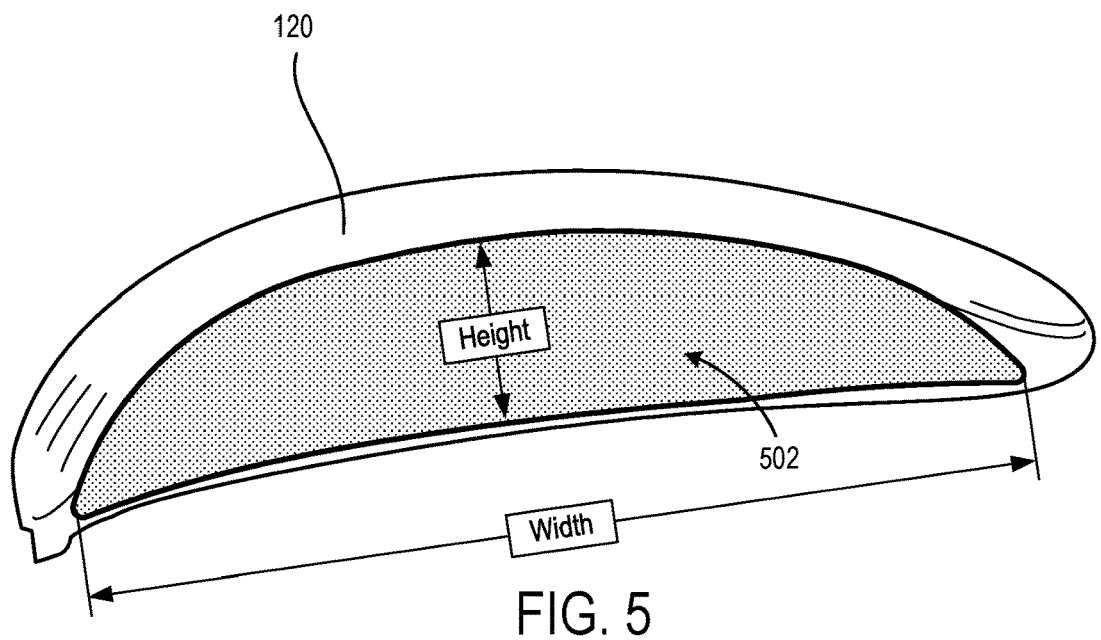

FIG. 5 illustrates an exemplary contact pad that includes a curved region having a shape that is defined by a high order polynomial as described herein.

Figure 6A:
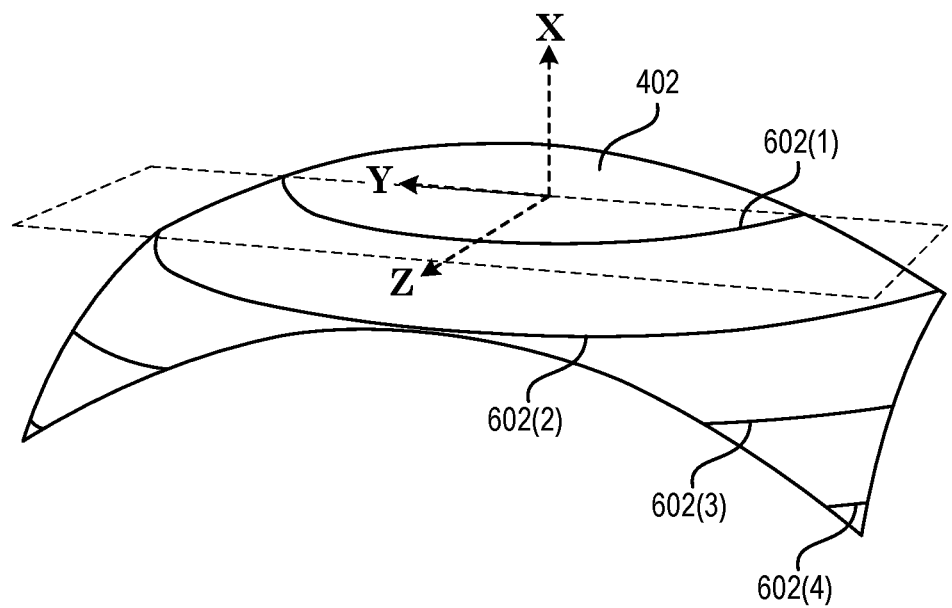

FIG. 6A illustrates an exemplary best fit surface that is defined by a high order polynomial.

Figure 6B:
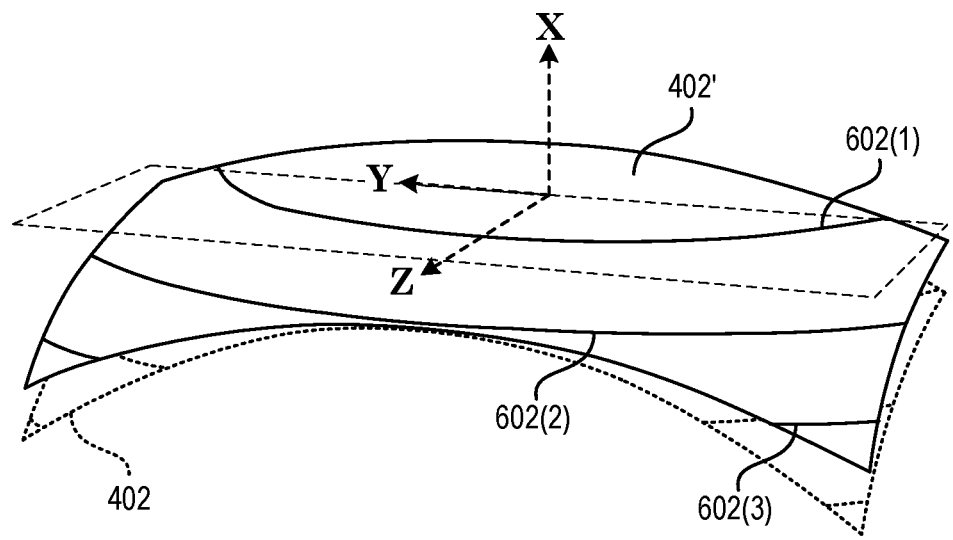

FIG. 6B illustrates the exemplary best fit surface of FIG. 6A after having one or more constant values modified to alter the shape of the exemplary best fit surface.

DETAILED DESCRIPTION

The following Detailed Description describes technologies for optimizing a support assembly to provide universal fitting characteristics to Head-Mounted Display (HMD) devices. The technologies disclosed herein enable a display of an HMD device to be reliably aligned within multiple different users' fields-of-view notwithstanding significant variations of shape and size between these users' heads. Optimal positioning of the display within multiple different users' fields-of-view may be achieved by positionally constraining the HMD device against a predetermined portion of the head that varies relatively slightly as compared to other portions of the head. Moreover, a contact pad of the support assembly may be specifically shaped according to a high order polynomial that serves to model a best fit surface for the predetermined portion of the forehead. In this way, the support assembly for the HMD device may be optimized so as to minimize the geometric variations between users' fields-of-view and the surface(s) of the users' heads that positionally constrain a display within the users' fields of view.

Figure 1:
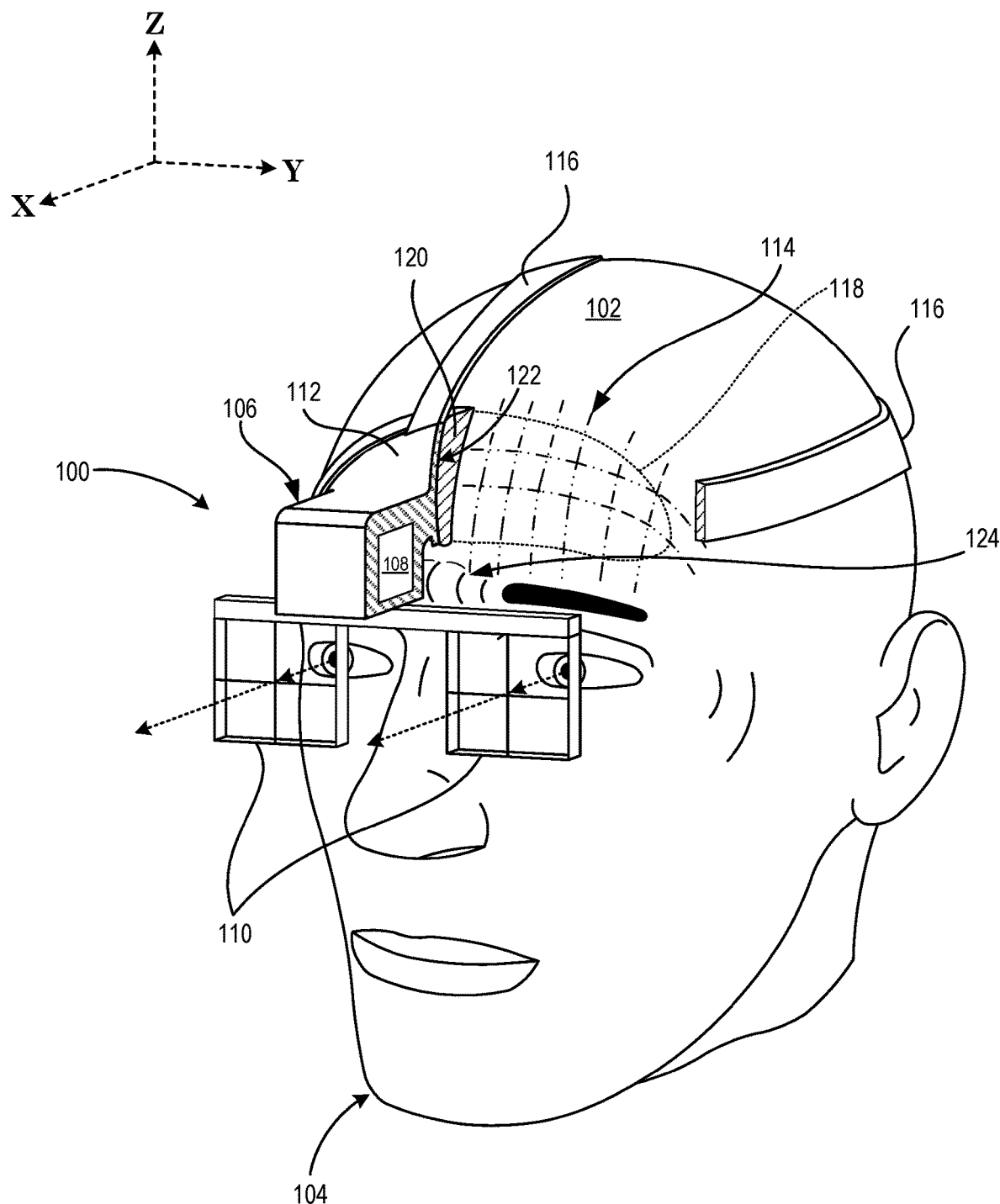
FIG. 1 is a cut-away perspective view of an exemplary HMD device that is being supported on a head of a user by a universally fitting support assembly 106 (also referred to as a "support assembly").

FIG. 1 is a cut-away perspective view of an exemplary HMD device 100 that is being supported on a head 102 of a user 104 by a universally fitting support assembly 106 (also referred to as a "support assembly"). The HMD device 100 may include a housing 108 that at least partially encloses various electronic components (e.g., a central processing unit, a graphics processing unit, and/or a battery). As illustrated, the housing 108 may be integrated into the design of the support assembly 106. The support assembly 106 may support a display 110 that is configured to generate images within a field-of-view of the user 104 (e.g., in front of the user's eyes). For example, the HMD device 100 can be used for augmented reality (AR) and/or virtual reality (VR) applications. In implementations where the HMD device 100 is an AR-based HMD device, the display 110 may be a transparent display element that enables the user 104 to concurrently see both a real-world environment (e.g., that is surrounding her) and AR content being generated by the display 110.

In the illustrated embodiment, the user 104 is properly wearing the support assembly 106 so that the display 110 protrudes downward from the support assembly 106 into the user's field-of-view. The support assembly 106 includes a pressure plate 112 that is mountable to a forehead 114 (illustrated with contoured gridlines) of the user 104 in order to generate sufficient supporting forces to maintain a position of the display 110 with respect to the user's field-of-view. In an exemplary embodiment, the pressure plate 112 is a substantially rigid injection molded plastic element. As further illustrated, the support assembly 106 may include one or more bands 116 for encircling the user's 104 head 102 to generate pressure between the pressure plate 112 and the user's forehead 114. In various embodiments, the band(s) 116 may be at least partially flexible so as to comfortably conform to the contours of the user's head 102. For example, the band(s) 116 may be a flexible elastic band that, in various embodiments, is also adjustable. The band(s) 116 may be directly and/or indirectly attached to the pressure plate 112 in order to support various components of the HMD device 100 such as, for example, the aforementioned electronic components and/or the display 110 in an appropriate position with respect to the head 102. As illustrated, a band 116 wraps over the top of the user's head 102 and is attached to the pressure plate 112. In the illustrated embodiment, the band is directly attached to the pressure plate 112.

The support assembly 106 also includes a contact pad 120 that is disposed against a proximal surface 122 of the pressure plate 112. The contact pad 120 distributes the pressure generated by the pressure plate 112 across a contact area 118 (illustrated with a dotted outline within the forehead 114) so as to prevent points of high pressure causing discomfort to the user 104. In accordance with the aforementioned context of the term "proximal," the proximal surface 122 of the pressure plate 112 faces the contact area 118 of the user's 104 forehead 114. It can be appreciated that as illustrated the contact pad 120 is being compressed by the proximal surface 122 against the contact area 118. The contact pad 120 may be formed from a variety of suitably compressible material such as, for example, various commercially available urethane and/or neoprene materials that provide pressure distribution characteristics.

As described in more detail below, the contact pad 120 may include a curved region (not visible in FIG. 1) on the side that contacts the user's 104 forehead 114 (i.e. the side that is opposite the pressure plate 112). In some embodiments, the curved region may correspond to an empirically determined best fit surface. For example, the curved region may have a shape that is defined by a high order polynomial which defines (exactly or approximately) this best fit surface with respect to a coordinate system. For purposes of the present discussion, a cartesian coordinate system is illustrated in association with various figures. The illustrated cartesian coordinate system includes a Z-axis defining a vertical direction with respect to the HMD device 100, a Y-axis defining a side direction with respect to the HMD device 100, and an X-axis defining a forward direction with respect to the HMD device 100. Although descriptions of the best fit surface and the high order polynomial are predominantly described herein with respect to cartesian coordinates systems, other suitable reference systems such as, for example, polar coordinate systems may also be used to implement the techniques described herein. As used herein, the term "high order polynomial" may refer generally to any polynomial function having at least one monomial term that is to the order of two or more (e.g., a squared term and/or a cubic term).

As illustrated, the support assembly 106 may extend outward (e.g., away from the contact pad) for a distance that is suitable to prevent contact with a glabella region 124 of the user's head 102. As described above, the glabella region 124 of the head may vary to a greater extent from one user to another than the forehead region 114 of the head. Accordingly, by designing the support assembly 106 so as to prevent contact with the glabella region 124 (e.g., by protruding over the glabella/brow region as illustrated), the techniques described herein enable the HMD device 100 to be positionally constrained based on contact that is made with regions of the head that vary relatively slightly between large sets of different users.

Figure 2:
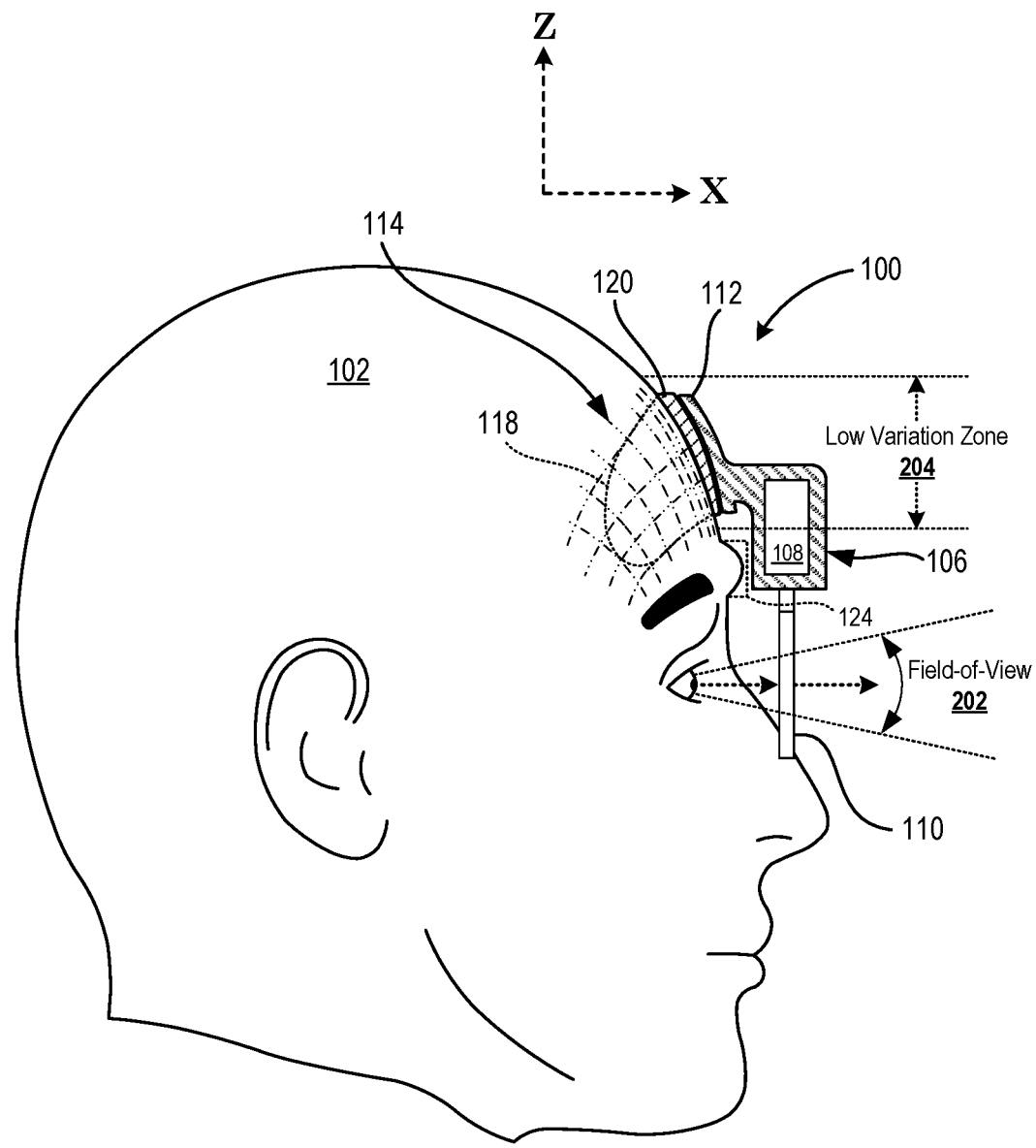
FIG. 2 is a cut-away side view of the exemplary HMD device that is being supported on a head by the support assembly 106.

Turning now to FIG. 2, a cut-away side view is shown of the exemplary HMD device 100 that is being supported on a head 102 by the support assembly 106 of FIG. 1. As shown in FIG. 2, the support assembly 106 may be designed so as to derive supporting forces from one or more predetermined regions of the head 102 while preventing physical contact with one or more other predetermined regions of the head 102. In particular, the support assembly 106 includes a pressure plate 112 and a contact pad 120 that conform to a specific size and shape of a sub-region of the user's forehead 114. In the illustrated example, the support assembly 106 is designed so that the display 110 is positionally constrained with respect to the user's field-of-view 202 based on supporting forces that are derived from a low variation zone 204 of the head 102. As used herein, the term "low variation zone" refers to a predetermined portion of the head which is empirically determined to vary to a lesser extent from one user to another than one or more other portions of the head. An exemplary such "low variation zone" may correspond to a region of the head that falls between 20 millimeters (mm) to 50 mm above the glabella of a subject user's head and is 100 mm wide and centered on the subject user's head.

As further illustrated, the support assembly 106 is also designed to extend outward (e.g., in the positive X-direction) to avoid contact with a region of the head 102 that varies greatly from one user to another. Specifically, in the illustrated example, the support assembly 106 extends outward from the pressure plate 112 a predetermined distance (e.g., 10 mm, 15 mm, 20 mm, etc.) so that the portion of the support assembly 106 that extends downward (e.g., in the negative Z-direction) to support the display 110 within the user's 104 field-of-view 202 does not come into physical contact with the glabella region 124. In this way, the illustrated HMD device 100 may be worn by a variety of different user's 104 having vastly different glabella shapes without such variations impairing the placement of the display 110 with respect to these users' fields-of-view.

As shown in FIG. 2, the surface of the contact pad 120 that contacts the user's forehead 114 may be sloped in relation to the display 110. In this way, the display 110 may be maintained at an angle that is normal or close to normal with respect to the user's field of view when the HMD device 100 is being worn by the user 104. For example, the contact pad 120 may be sloped with respect to the display 110 by an amount that is determined based on the slopes of the user's foreheads in order to ensure that the display 110 is within the optimum gaze angles of −7 to 0 degrees in relation to the horizon.

Turning now to FIGS. 3A and 3B (collectively referred to herein as FIG. 3), illustrated is an exemplary time-series of movements of a fitting process for the HMD device 100 to ensure that the display 110 is optimally placed within the user's field-of-view 202. In particular, the fitting process ensures that the user's pupil 306 resides within an eye box 302 of the display 110 when the HMD device 100 is put on (e.g., worn) by the user 104.

With particular reference to FIG. 3A, illustrated are first and second movements of the HMD 100 device for bringing the HMD device 100 into contact with the head 102 with the eye box 302 appropriately lined up with respect to the field-of-view 202. At time $T_1$, the HMD device 100 is vertically aligned (e.g., aligned in the Z-direction) with respect to the user's field-of-view 202. For example, the user 104 may adjust the HMD device 100 up and/or down until imagery being generated by the display 110 is visible.

At time $T_2$, the HMD device 100 is horizontally moved (e.g., moved in the X-direction) into contact with the user's head 102. As illustrated, the user's forehead 114 is sloped to a greater extent than the contact pad 120 and pressure plate 112. This results in the bottom portion of the contact pad 120 initially coming into contact with the forehead 114 with a gap 304 being formed between the forehead 114 and remaining portions of the contact pad 120. As illustrated, the HMD device 100 is designed so that the user's pupil falls within the eye box 302 of the display 110 when the contact pad 120 initially contacts the forehead 114. As used herein, the term "eye box" may generally refer to a three-dimensional volume of space that is defined in relation to the display 110 and from which a user's pupil is capable of visibly perceiving imagery that is being generated by the display 110.

Referring now to FIG. 3B, illustrated is a third movement of the HMD 100 device that brings the remaining portion of the contact pad 120 into contact with the user's forehead 114 to adequately secure the HMD 100 to the user's head 102. In particular, at time $T_3$, the HMD device 100 is pivoted about the bottom portion of the contact pad 120 in a direction that brings the contact pad 120 fully into contact with the forehead 114 and that moves the display farther away from the user's eyes. Once the HMD device 100 has been rotated into a comfortable and stable position, the HMD device 100 may be adequately secured to the user's head 102 by, for example, encircling the band(s) 116 (not shown in FIG. 3) around the head 102 to cause the pressure plate 112 to compress the contact pad 120 against the forehead 114. As shown in FIG. 3B, the user's pupil 306 remains within the eye box 302 even after the HMD device 100 is rotated to close the gap 304 between the contact pad 120 and the forehead 114.

Turning now to FIG. 4, illustrated is an exemplary best fit surface 402 (shown with a dotted pattern) that is empirically determined by deploying a curve fitting algorithm to a plurality of forehead point clouds. The forehead point clouds map geometries for a sample set of users' foreheads 114. As used herein, the term "forehead point cloud" refers to a set of data points in space where each individual data point represents an individual point that falls on a surface of a subject forehead. It can be appreciated that a variety of technologies may be deployed to generate the forehead point clouds such as, for example, contact three-dimensional (3D) scanners that probe object surfaces or non-contact 3D scanners which emit radiation toward an object and detect radiation reflected by the object.

In some embodiments, the forehead point clouds may be limited to a predetermined area of the users' heads. As a specific but non-limiting example, the point clouds may be vertically limited to an area that extends from 20 millimeters (mm) to 55 mm above a subject user's glabella and horizontally limited to an area that extends a total of 100 mm and is centered on the user's head. In some cases, the predetermined area may be defined based on one or more relationships between different reference points on the users' head. As a specific but non-limiting example, the predetermined area of a subject user's head may be horizontally limited based on a 60 percent distance between the subject user's pupils and temples.

In some embodiments, the best fit surface 402 may be determined by designating an individual forehead point cloud as a reference point cloud and then aligning the remaining forehead point clouds to the reference point cloud. In some instance, the reference point cloud may be selected based on having the least amount of aggregated variation to all of the other forehead point clouds. The remaining forehead point clouds may be aligned individually to the reference point cloud by shifting and/or tiling each point cloud to minimize the variation from the reference point cloud. Once the remaining forehead point clouds have been individually aligned to the reference point cloud, the best fit surface 402 may be determined based on one or more curve fitting algorithms. For example, the method of least squares may be deployed to fit a polynomial regression model to the numerous data points included within the aligned forehead point clouds.

Application of the curve fitting algorithm to the aligned forehead point clouds may yield a high order polynomial of an Nth degree which defines the best fit surface in terms of relationships between different variables of a coordinate system (e.g., a cartesian coordinate system). One or more terms of the yielded high order polynomial may then be selected for use in defining a shape of the contact pad. An exemplary such high order polynomial may be a third-degree polynomial as represented by the equation:

$$X = C_0 + C_1 Z + C_2 Y^2 + C_3 Z^2 + C_4 Z^3 \quad \text{(Eq. 1)}$$

where each of $C_0$, $C_1$, $C_2$, $C_3$, and $C_4$ are constants and where each of X, Y, and Z are variables that correspond to a cartesian coordinate system (e.g., as shown in FIGS. 1 and 2). It can be appreciated that the exemplary high order polynomial includes multiple individual monomial terms, each which relate the X coordinate variable to one or both of the Y coordinate variable or the Z coordinate variable. For example, the "$C_1 \times Z$" monomial term linearly relates the X coordinate variable to the Z coordinate variable. As another example, the "$C_2 \times Y^2$" monomial term quadratically relates the X coordinate variable to the Y coordinate variable.

As illustrated, the proximal surface 122 of the pressure plate 112 and the best fit surface 402 may serve as boundaries for a contact pad envelope 404. To illustrate this point, FIG. 5 illustrates an exemplary contact pad 120 having a curved region 502 having a shape that is defined by the high order polynomial. It should be appreciated that the curved region 502 of the contact pad 120 contacts the forehead 114 of the user 104 when the HMD device 100 is being worn by the user 104. Another surface of the contact pad 120 that is opposite the curved region 502 (and therefore is not visible in FIG. 5) contacts the proximal surface 122 of the contact pad 120.

In some embodiments, the curved region 502 of the contact pad 120 may have a width and a height that is sized so that the HMD device 100 is positionally referenced from exclusively the low variation zone 204 described in relation to FIG. 2. As a specific but non-limiting example, the curved region 502 of the contact pad 120 may have a width that is less than 125 millimeters (mm) and a height that is less than 70 mm. As another specific but non-limiting example, the curved region 502 of the contact pad 120 may have a width that is less than 100 millimeters (mm) and a height that is less than 50 mm. As yet another specific but non-limiting example, the curved region 502 of the contact pad 120 may have a width that is less than 90 millimeters (mm) and a height that is less than 40 mm. As yet another specific but non-limiting example, the curved region 502 of the contact pad 120 may have a width that is less than 80 millimeters (mm) and a height that is less than 35 mm.

In various embodiments, the contact pad 120 may have a thickness distribution that corresponds to a difference between an inner surface and an outer surface of the aligned "forehead" point clouds. The inner surface may be defined as a surface that includes at least a threshold amount (e.g., 100%, 90%, etc.) of the innermost points of all the "forehead" point clouds. For example, after all of the individual forehead point clouds have been aligned with respect to the designated reference point cloud, the inner surface may be generated by selecting the innermost points. As used herein, the term "innermost point" may refer to a particular point that is farthest in the negative X direction within any given area as defined by specific Y and Z coordinate values. The outer surface may be defined as a surface that includes at least a threshold amount of the outermost points of all the "forehead" point clouds. As used herein, the term "outermost point" may refer to a particular point that is farthest in the positive X direction within any given area as defined by specific Y and Z coordinate values.

It will be appreciated by one skilled in the art that the difference between the inner surface and the outer surface may indicate the maximum amount of available compression (e.g., in terms of distance) that the contact pad 120 should provide at any given point in order to accommodate all of the foreheads of the sample set of users. Accordingly, setting the thickness distribution of the contact pad 120 to correspond to this difference may minimize the thickness of the contact pad 120 needed to provide universal fitting characteristics to the HMD device 100. In an exemplary embodiment, the contact pad 120 may have a thickness distribution that provides a maximum available compression distance of 8 mm as measured in a normal direction from the curved region of the contact pad 120.

In some embodiments, the contact pad 120 may be designed such that the pressure exerted by the pressure plate 112 against the contact pad 120 causes a bottom portion 308 of the contact pad 120 to compress a first distance and a top portion 310 of the contact pad 120 to compress a second distance that is greater than the first distance. For example, the top portion 310 of the contact pad 120 may be thicker than the bottom portion 308 so that an even distribution of pressure across the contact pad 120 results in the top portion 310 being compressed (e.g. in terms of displacement) to a greater extent than the bottom portion 308.

Turning now to FIG. 6A, illustrated is an exemplary best fit surface 402 that is defined by a high order polynomial. In particular, the specific but non-limiting exemplary best fit surface 402 is specifically defined by the equation:

$$X=6.22+(-0.24)Z+(-0.008)Y^2+(-0.008)Z^2+(-0.0004)Z^3 \quad \text{(Eq. 1.1)}$$

which is a version of Equation 1 with specific values for each of $C_0$, $C_1$, $C_2$, $C_3$, and $C_4$. The orientation of the coordinate system that is shown in FIG. 6A matches the orientation of the coordinate system shown in FIGS. 1, 2, and 4. Each of the discrete values for the constants affect the shape of the best fit surface and, therefore, the shape of the curved region 502 of the contact pad 120. For example, the value of 6.22 for the constant $C_0$ represents a shift of the best fit surface 402 in the X direction.

With specific reference to the "$C_1 \times Z$" monomial term of Equation 1, it can be appreciated that the value of the constant $C_1$ impacts the slope of the curved region 502 in relation to the HMD device 100. In particular, this monomial term linearly relates the X coordinate variable to the Z coordinate variable based on the constant $C_1$. The greater the value for $C_1$, the greater the slope of the curved region 502 in relation to the HMD device 100 and, therefore, the display 110. In some embodiments, the constant $C_1$ is within the range of −0.20 to −0.28. In some embodiments, the constant $C_1$ is within the range of −0.22 to −0.26.

With specific reference to the "$C_2 \times Y^2$" monomial term of Equation 1, it can be appreciated that the value of the constant $C_2$ impacts how much the curved region 502 curves horizontally across the forehead 114. To better illustrate this point, FIG. 6B illustrates the exemplary best fit surface 402 of FIG. 6A after having one or more constant values modified to alter the shape of the exemplary best fit surface 402. In FIG. 6B, the exemplary best fit surface of FIG. 6A is shown in dashed-line form and is labeled 402 and the newly altered best fit surface is shown in solid-line form and is labeled 402'. The exemplary best fit surface 402 of FIG. 6A is precisely defined by the equation 1.1. In FIG. 6B, however, the constant $C_2$ has been changed from −0.008 to −0.005 so that horizontal curvature of the modified best fit surface 402' of FIG. 6B is less than that of the best fit surface 402 of FIG. 6A. In some embodiments, the constant $C_2$ is within the range of −0.005 to −0.010. In some embodiments, the constant $C_2$ is within the range of −0.005 to −0.012.

With specific reference to the "$C_3 \times Z^2$" monomial term of Equation 1, it can be appreciated that the value of the constant $C_3$ impacts how much the curved region 502 curves vertically across the forehead 114. In some embodiments, the constant $C_3$ is within the range of −0.005 to −0.012. In some embodiments, the constant $C_3$ is within the range of −0.002 to −0.015.

With specific reference to the "$C_4 \times Z^3$" monomial term of Equation 1, it can be appreciated that the value of the constant $C_4$ also impacts how much the curved region 502 curves vertically across the forehead 114. In some embodiments, the constant $C_4$ is within the range of −0.00025 to −0.0005. In some embodiments, the constant $C_4$ is within the range of −0.0002 to −0.0006.

It should be appreciated that any reference to "first," "second," etc. items and/or abstract concepts within the description is not intended to and should not be construed to necessarily correspond to any reference of "first," "second," etc. elements of the claims. In particular, within this Detailed Description and/or the previous Summary, items and/or abstract concepts such as, for example, individual constants and/or monomial terms and/or coordinate variables may be distinguished by numerical designations without such designations corresponding to the claims or even other paragraphs of the Summary and/or Detailed Description. For example, any designation of a "first monomial term" and "second monomial term" of the high order polynomial within a paragraph of this disclosure is used solely to distinguish two different monomial term within that specific paragraph—not any other paragraph and particularly not the claims. Similarly, subscript designations of individual constants within the Summary and/or Detailed Description are not intended to indicate any correlation to the claims. For example, a first constant recited in the claims may or may not correspond to the constant $C_1$ discussed in the Detailed Description.

It should further be appreciated that a single curved surface may be mathematically represented by different polynomial equations that are referenced from different coordinate systems. For example, a single surface may be precisely represented by a first polynomial equation that is referenced from a first coordinate system while the same surface and may also be represented by a second polynomial that is referenced from a second coordinate system that is located and/or oriented differently than the first coordinate system. Furthermore, in the various figures of the present disclosure, various coordinate systems are illustrated as being located differently with respect to the HMD device 100 and/or curved region 502 and/or best fit surface 402. Accordingly, the appended claims are not limited to any specific location and/or specific origin for a coordinate system from which the shape of the curved region 502 is measured unless such specific location and/or origin are expressly recited in the claims.

EXAMPLE CLAUSES

The disclosure presented herein may be considered in view of the following clauses.

Example Clause A, a Head-Mounted Display (HMD) device, comprising: a display to generate imagery within a field-of-view associated with a user; at least one support assembly from which the display protrudes into the field-of-view, wherein the at least one support assembly includes: a pressure plate that is mounted in proximity to a forehead of the user, and at least one band for encircling a head of the user to generate pressure between the pressure plate and the forehead; and a contact pad disposed against a proximal surface of the pressure plate, wherein the contact pad includes a curved region that becomes at least partially compressed against the forehead by the pressure plate, and wherein a shape of the curved region is defined by a high order polynomial.

Example Clause B, the HMD device of Example Clause A, wherein the high order polynomial includes at least: a first monomial term that quadratically relates a first coordinate variable to a second coordinate variable; a second monomial term that quadratically relates the first coordinate variable to a third coordinate variable; and a third monomial term that cubically relates the first coordinate variable to the third coordinate variable.

Example Clause C, the HMD device of Example Clause B, wherein the first monomial term includes a first constant that is inclusively bounded within a first range from −0.005 to −0.012.

Example Clause D, the HMD device of Example Clause B, wherein the second monomial term includes a second constant that is inclusively bounded within a second range from −0.002 to −0.015.

Example Clause E, the HMD device of Example Clause B, wherein the third monomial term includes a third constant that is inclusively bounded within a third range from −0.0002 to −0.0006.

Example Clause F, the HMD device of Example Clause B, wherein the high order polynomial includes at least a fourth monomial term that linearly relates the first coordinate variable to the second coordinate variable, and wherein the fourth monomial term includes a fourth constant that is indicative of a slope of the curved region with respect to the display.

Example Clause G, the HMD device of Example Clause F, wherein the fourth constant is inclusively bounded within a fourth range from −0.20 to −0.28.

Example Clause H, the HMD device of any one of Example Clauses A through G, wherein the pressure between the pressure plate and the forehead causes a bottom portion of the contact pad to compress a first distance and a top portion of the contact pad to compress a second distance, the second distance being greater than the first distance to induce rotation of the display away from a pupil of the user.

Example Clause I, the HMD device of any one of Example Clauses A through H, wherein a width of the curved region is less than 100 millimeters, and wherein a height of the curved region is less than 60 millimeters.

Example Clause J, a system, comprising: a display that is configured to generate imagery; a support assembly coupled to the display to support the display within a field-of-view of a user, wherein the support assembly includes at least one band to secure a pressure plate to a forehead of the user; and a contact pad having a curved region that becomes at least partially compressed against the forehead by the pressure plate, wherein a shape of the curved region is defined by a high order polynomial having at least: a first monomial term that quadratically relates a first coordinate variable to a second coordinate variable; and a second monomial term that quadratically relates the first coordinate variable to a third coordinate variable.

Example Clause K, the system of Example Clause J, wherein the first monomial term includes a first constant that is inclusively bounded within a first range from −0.005 to −0.010.

Example Clause L, the system of any one of Example Clauses J through K, wherein the second monomial term includes a second constant that is inclusively bounded within a second range from −0.005 to −0.012.

Example Clause M, the system of any one of Example Clauses J through L, wherein the high order polynomial further includes a third monomial term that cubically relates the first coordinate variable to the third coordinate variable.

Example Clause N, the system of Example Clause M, wherein the third monomial term includes a third constant that is inclusively bounded within a third range from −0.00025 to −0.0005.

Example Clause O, the system of any one of Example Clauses J through N, wherein the high order polynomial further includes a third monomial term that linearly relates the first coordinate variable to the second coordinate variable.

Example Clause P, the system of any one of Example Clauses J through O, wherein the support assembly is configured to compress the contact pad against the forehead to generate supporting forces to positionally constrain the display within the field-of-view of the user.

Example Clause Q, the system of any one of Example Clauses J through P, wherein a width of the curved region is less than 100 millimeters, and wherein a height of the curved region is less than 50 millimeters.

Example Clause R, a Head-Mounted Display (HMD) device, comprising: a display to generate imagery within a field-of-view associated with a user; a contact pad having a curved region that is shaped in accordance with a best fit surface of a plurality of forehead point clouds; and a support assembly from which the display protrudes, wherein the support assembly includes a band for encircling a head of the user to generate pressure between the contact pad and a forehead of the user to positionally constrain the display within the field-of-view of the user.

Example Clause S, the HMD device of Example Clause R, wherein the best fit surface is defined by a high order polynomial that quadratically relates a first coordinate variable to each of a second coordinate variable a third coordinate variable.

Example Clause T, the HMD device of Example Clause R, wherein a width of the curved region is less than 125 millimeters, and wherein a height of the curved region is less than 70 millimeters.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A Head-Mounted Display (HMD) device, comprising:
a display to generate imagery within a field-of-view associated with a user;
at least one support assembly from which the display protrudes into the field-of-view, wherein the at least one support assembly includes:

a pressure plate that is mounted in proximity to a forehead of the user, and at least one band for encircling a head of the user to generate pressure between the pressure plate and the forehead; and a contact pad disposed against a proximal surface of the pressure plate, wherein the contact pad includes a curved region that is shaped in accordance with a best fit surface of a plurality of forehead geometries, wherein:

individual forehead geometries, of the plurality of forehead geometries, are commonly aligned with respect to a reference coordinate system, the curved region of the contact pad corresponds to a first zone that is empirically determined to exhibit a lesser thickness profile between innermost points and outermost points of the plurality of forehead geometries, that are commonly aligned with respect to the reference coordinate system, as compared to a second zone residing outside a perimeter of the first zone, wherein the contact pad becomes at least partially compressed against the forehead, of the user, by the pressure plate to generate supporting forces that positionally constrain an eye box of the display with respect to a pupil of the user.

2. The HMD device of claim 1, wherein the best fit surface is defined by a polynomial that corresponds to the first zone and that includes at least:

a first monomial term that quadratically relates a first coordinate variable to a second coordinate variable;

a second monomial term that quadratically relates the first coordinate variable to a third coordinate variable; and a third monomial term that cubically relates the first coordinate variable to the third coordinate variable.

3. The HMD device of claim 2, wherein the first monomial term includes a first constant that is inclusively bounded within a first range from −0.005 to −0.012.

4. The HMD device of claim 2, wherein the second monomial term includes a second constant that is inclusively bounded within a second range from −0.002 to −0.015.

5. The HMD device of claim 2, wherein the third monomial term includes a third constant that is inclusively bounded within a third range from −0.0002 to −0.0006.

6. The HMD device of claim 2, wherein the polynomial includes at least a fourth monomial term that linearly relates the first coordinate variable to the second coordinate variable, and wherein the fourth monomial term includes a fourth constant that is indicative of a slope of the curved region with respect to the display.

7. The HMD device of claim 6, wherein the fourth constant is inclusively bounded within a fourth range from −0.20 to −0.28.

8. The HMD device of claim 1, wherein the pressure between the pressure plate and the forehead causes a bottom portion of the contact pad to compress a first distance and a top portion of the contact pad to compress a second distance, the second distance being greater than the first distance to induce rotation of the display away from a pupil of the user.

9. The HMD device of claim 1, wherein a width of the curved region is less than 100 millimeters, and wherein a height of the curved region is less than 60 millimeters.

10. A system, comprising:

a display that is configured to generate imagery;

a support assembly coupled to the display to support the display within a field-of-view of a user, wherein the support assembly includes at least one band to secure a pressure plate to a forehead of the user; and a contact pad having a curved region that becomes at least partially compressed against the forehead by the pressure plate, wherein a shape of the curved region is defined by a polynomial that corresponds to a first zone for a sample set of forehead geometries that is empirically determined to exhibit a lesser thickness profile between innermost points and outermost points of the sample set of forehead geometries, and wherein the polynomial includes at least:

a first monomial term that quadratically relates a first coordinate variable to a second coordinate variable; and a second monomial term that quadratically relates the first coordinate variable to a third coordinate variable.

11. The system of claim 10, wherein the first monomial term includes a first constant that is inclusively bounded within a first range from −0.005 to −0.010.

12. The system of claim 10, wherein the second monomial term includes a second constant that is inclusively bounded within a second range from −0.005 to −0.012.

13. The system of claim 10, wherein the polynomial further includes a third monomial term that cubically relates the first coordinate variable to the third coordinate variable.

14. The system of claim 13, wherein the third monomial term includes a third constant that is inclusively bounded within a third range from −0.00025 to −0.0005.

15. The system of claim 10, wherein the polynomial further includes a third monomial term that linearly relates the first coordinate variable to the second coordinate variable.

16. The system of claim 10, wherein the support assembly is configured to compress the contact pad against the forehead to generate supporting forces to positionally constrain the display within the field-of-view of the user.

17. The system of claim 10, wherein a width of the curved region is less than 100 millimeters, and wherein a height of the curved region is less than 50 millimeters.

18. A Head-Mounted Display (HMD) device, comprising:

a display to generate imagery within a field-of-view associated with a user;

a contact pad having a curved region that is shaped in accordance with a best fit surface of a plurality of forehead point clouds, wherein:

individual forehead point clouds, of the plurality of forehead point clouds, are commonly aligned with respect to a reference coordinate system, the curved region of the contact pad corresponds to a first zone that is empirically determined to exhibit a lesser thickness profile between innermost points and outermost points of the plurality of forehead point clouds, that are commonly aligned with respect to the reference coordinate system, as compared to a second zone residing outside a perimeter of the first zone, and the best fit surface is defined by a polynomial that quadratically relates a first coordinate variable to each of a second coordinate variable and a third coordinate variable; and a support assembly from which the display protrudes, wherein the support assembly includes a band for encircling a head of the user to generate pressure between the contact pad and a forehead of the user to positionally constrain the display within the field-of-view of the user.

19. The HMD device of claim 18, wherein a width of the curved region is less than 125 millimeters, and wherein a height of the curved region is less than 70 millimeters.

20. The Head-Mounted Display (HMD) device of claim 18, wherein the contact pad has a varying thickness profile that corresponds to a thickness distribution of the plurality of point clouds.

\* \* \* \* \*